(12) United States Patent
Kautzky et al.

(10) Patent No.: US 7,719,802 B2
(45) Date of Patent: May 18, 2010

(54) MAGNETIC SENSOR WITH ELECTRICALLY DEFINED ACTIVE AREA DIMENSIONS

(75) Inventors: Michael C. Kautzky, Eagan, MN (US); David J. Larson, Northfield, MN (US); Bradley H. Miller, Minneapolis, MN (US); Eric W. Singleton, Maple Plain, MN (US); Dimitar V. Dimitrov, Edina, MN (US); Eric L. Granstrom, Golden Valley, MN (US); Song S. Xue, Eden Prairie, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 65 days.

(21) Appl. No.: 10/668,437

(22) Filed: Sep. 23, 2003

(65) Prior Publication Data

US 2005/0063100 A1 Mar. 24, 2005

(51) Int. Cl.
*G11B 5/33* (2006.01)
(52) U.S. Cl. .................................. 360/324.2
(58) Field of Classification Search ........................ None
See application file for complete search history.

(56) References Cited

U.S. PATENT DOCUMENTS

| 5,351,158 | A | | 9/1994 | Shibata |
| 5,684,658 | A | * | 11/1997 | Shi et al. ..................... 360/315 |
| 5,958,612 | A | | 9/1999 | Saito et al. |
| 6,005,753 | A | | 12/1999 | Fontana, Jr. et al. |
| 6,661,627 | B1 | * | 12/2003 | Kadokawa ............... 360/327.3 |
| 2002/0097533 | A1 | * | 7/2002 | Funayama et al. ....... 360/324.1 |
| 2002/0160228 | A1 | | 10/2002 | Ohtsu et al. |
| 2003/0016474 | A1 | | 1/2003 | Biskeborn |
| 2003/0189798 | A1 | * | 10/2003 | Lin et al. .................... 360/322 |

* cited by examiner

*Primary Examiner*—David D Davis
(74) *Attorney, Agent, or Firm*—Kinney & Lange, P.A.

(57) ABSTRACT

A magnetic sensor having adjustable electrical dimensions, such as electrical read width and electrical stripe height, is disclosed. The magnetic sensor includes a sensor stack with one or more bias electrodes positioned with respect to the sensor stack. The electrical width or electrical stripe height of the sensor stack is a function of a voltage applied to the bias electrodes. The electric field produced by the bias electrodes alters the electrical profile of the magnetoresistive device.

25 Claims, 7 Drawing Sheets

MAGNETIC SENSOR WITH ELECTRICALLY DEFINED ACTIVE AREA DIMENSIONS

BACKGROUND OF THE INVENTION

The present invention relates generally to the field of magnetic data storage and retrieval systems. More particularly, the present invention relates to a read sensor having adjustable electrical dimensions.

In a magnetic data storage and retrieval system, a magnetic read/write head typically includes a reader portion having a magnetoresistive (MR) sensor for retrieving magnetically encoded information stored on a magnetic disc. Magnetic flux from the surface of the disc causes rotation of the magnetization vector of a sensing layer of the MR sensor, which in turn causes a change in electrical resistivity of the MR sensor. The change in resistivity of the MR sensor can be detected by passing a current through the MR sensor and measuring a voltage across the MR sensor. External circuitry then converts the voltage information into an appropriate format and manipulates that information as necessary to recover the information encoded on the disc.

MR sensors have been developed that can be characterized in three general categories: (1) anisotropic magnetoresistive (AMR) sensors, (2) giant magnetoresistive (GMR) sensors, including spin valve sensors and multilayer GMR sensors, and (3) tunneling magnetoresistive (TMR) sensors.

AMR sensors generally have a single MR layer formed of a ferromagnetic material. The resistance of the MR layer varies as a function of $\cos^2 \alpha$, where $\alpha$ is the angle formed between the magnetization vector of the MR layer and the direction of the sense current flowing in the MR layer.

GMR sensors have a series of alternating magnetic and nonmagnetic layers. The resistance of GMR sensors varies as a function of the spin-dependent transmission of the conduction electrons between magnetic layers separated by a non-magnetic conductive layer and the accompanying spin-dependent scattering which takes place at the interface of the magnetic and nonmagnetic layers and within the magnetic layers. The resistance of a GMR sensor depends on the relative orientations of the magnetization in consecutive magnetic layers, and varies as the cosine of the angle between the magnetization vectors of consecutive magnetic layers.

TMR sensors have a configuration similar to GMR sensors, except that the magnetic layers of the sensor are separated by a nonmagnetic insulating film thin enough to allow electron tunneling between the magnetic layers. The tunneling probability of an electron incident on the barrier from one magnetic layer depends on the character of the electron wave function and the spin of the electron relative to the magnetization direction in the other magnetic layer. As a consequence, the resistance of the TMR sensor depends on the relative orientations of the magnetization of the magnetic layers, exhibiting a minimum for a configuration in which the magnetizations of the magnetic layers are parallel and a maximum for a configuration in which the magnetizations of the magnetic layers are anti-parallel.

For all types of MR sensors, magnetization rotation occurs in response to magnetic flux from the disc. As the recording density of magnetic discs continues to increase, the width of the tracks on the disc must decrease, which necessitates smaller and smaller MR sensors. As MR sensors become smaller in size, particularly for sensors with dimensions less than about 0.1 micrometers (µm), the sensors have the potential to exhibit an undesirable magnetic response to applied fields from the magnetic disc. MR sensors must be designed in such a manner that even small sensors are free from magnetic noise and provide a signal with adequate amplitude for accurate recovery of the data written on the disc.

To sustain a compound annual growth rate in areal density of 60% or more over the next few years, read widths of less than 40 nm will be required. At these dimensions, the capability of conventional lithographic steppers and etch/strip processes to maintain adequate targeting and sigma control is uncertain. Alternate technologies that relax lithographic line width requirements while hitting electrical and magnetic width targets are desirable. In conventional devices, electrical read width and electrical stripe height have not been easily controlled. Rather, these electrical dimensions have been controlled by a combination of device properties, including physical line width, stabilizing magnet strength, shield-to-shield spacing, and bias current. The variance in electrical read width and electrical stripe height is influenced by the combined sigma of these separate elements, requiring separate optimization of each element. The present invention is directed to a read head having an adjustable electrical read width and electrical stripe height without separate optimization of these device properties.

BRIEF SUMMARY OF THE INVENTION

The present invention is a magnetic sensor having adjustable electrical dimensions, such as electrical read width and electrical stripe height. The magnetic sensor includes a sensor stack with bias electrodes positioned with respect to the sensor stack. The electrical width or electrical stripe height of the sensor stack is a function of the voltage provided to the biasing electrodes.

In one embodiment, two bias electrodes are disposed on opposing sides of the sensor stack and charged with a bias voltage such that the resulting electric field creates a charge carrier-depleted region at the stack junction whose depth is tunable by adjusting a magnitude of the electrode voltage. The depletion region causes the reader sense current to be constrained to the center of the sensor stack, thereby narrowing the electrical width.

In another embodiment, two bias electrodes are disposed on opposing sides and biased with voltages of opposite polarity. Alternatively, a single bias electrode biases one side of the magnetoresistive stack. The resulting electric field crowds the reader sense current to a thin region at the stack junction whose depth is tunable by adjusting a magnitude of the electrode voltage. This causes the reader sense current to be constrained to a side of the sensor stack, thereby narrowing the electrical width.

Optionally, a bias electrode may be positioned adjacent to the sensor stack on a side opposite from the air bearing surface. When a voltage is applied to the bias electrode, the resulting electric field crowds the reader sense current toward the air bearing surface, thereby adjusting the electrical stripe height of the sensor stack.

BRIEF DESCRIPTION OF THE DRAWINGS

FIG. 5b is a cross-section view of an alternative embodiment to the magnetoresistive device shown in FIG. 5a.

DETAILED DESCRIPTION

Figure 1A:
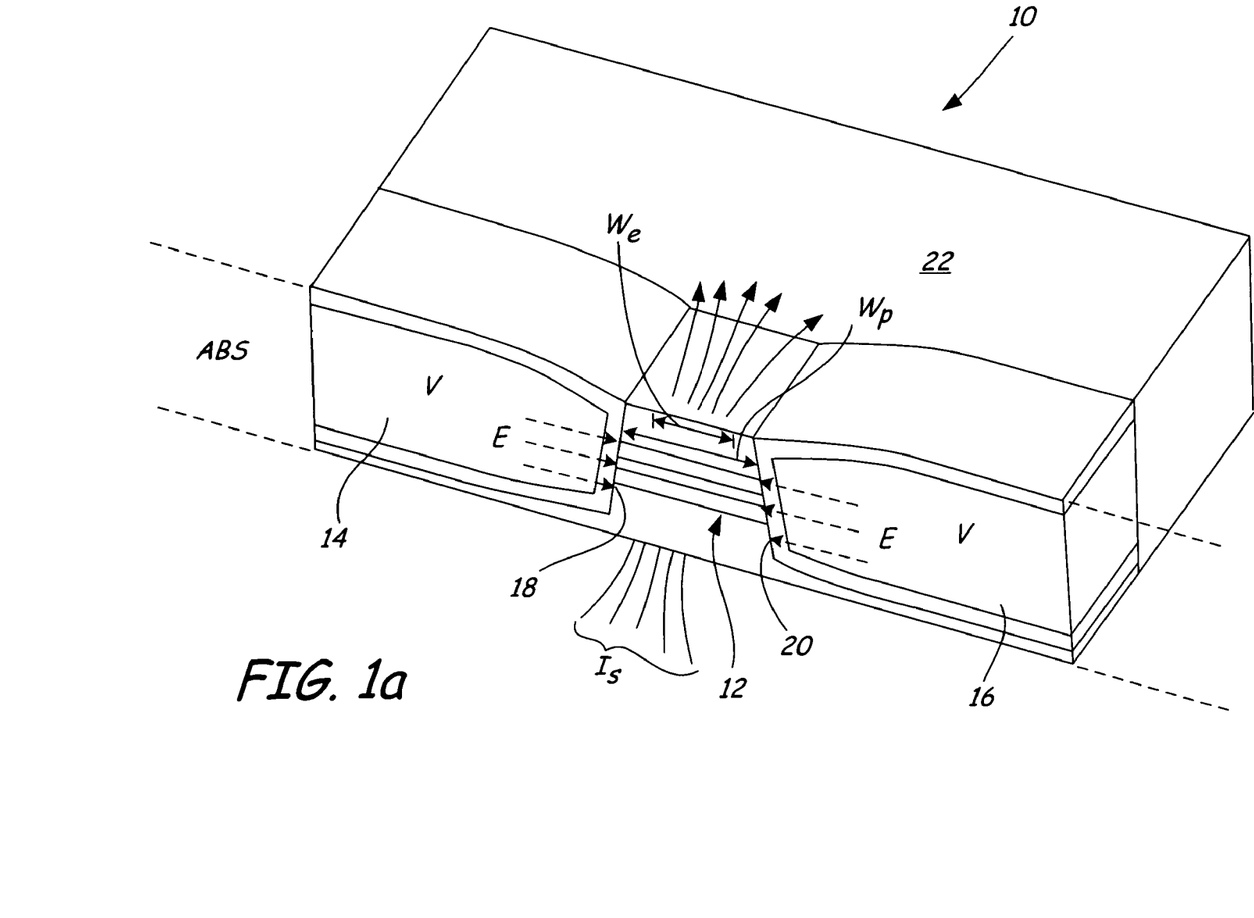
FIG. 1a is a perspective air bearing surface (ABS) view of a magnetoresistive device according to the present invention having an adjustable electrical read width.

FIG. 1a is a perspective air bearing surface (ABS) view of a magnetoresistive (MR) device 10 according to the present invention having an adjustable electrical read width. MR device 10 includes MR stack 12 positioned between biasing electrodes 14 and 16. MR stack 12 is preferably a current-perpendicular-to-plane (CPP) tunneling magnetoresistive (TMR) stack including two ferromagnetic sensing layers with a nonmagnetic tunnel barrier positioned therebetween. MR stack 12 may alternatively be another CPP stack configuration, such as a tri-layer CPP stack, a CPP spin valve, or a CPP reader with in-stack stabilization and bias. For stack configurations requiring an external stabilizing field parallel to the ABS, biasing electrodes 14 and 16 are permanent magnet layers which simultaneously stabilize the magnetic layers in MR stack 12. For stack configurations requiring either an external stabilizing field transverse to the ABS, or no external stabilizing field, biasing electrodes 14 and 16 are nonmagnetic conductive layers. Biasing electrode 14 is separated from MR stack 12 by thin dielectric layer 18, and biasing electrode 16 is separated from MR stack 12 by thin dielectric layer 20. Thin dielectric layers 18 and 20 preferably have a thickness of about 50-150 Å. MR device 10 also includes oxide layer 22 to protect the back edge of MR stack 12 after stripe height definition.

In operation, a sense current $I_S$ flows perpendicular to the plane of the layers of MR stack 12. As indicated above, the change in resistivity of MR stack 12 can be detected by passing sense current $I_S$ through MR stack 12 and measuring a voltage across MR stack 12. External circuitry then converts the voltage information into an appropriate format and manipulates that information as necessary to recover the information encoded on the disc.

MR stack 12 has a physical read width, $w_p$, that is defined by the area between thin dielectric layers 18 and 20. Physical read width $w_p$ defines the physical track width of MR device 10. As described above, the electrical read width of MR device 10 may be altered by adjusting electrical dimensions of MR stack 12, thereby increasing the resolution of the device without requiring adjustment of intricate physical dimensions. According to the present invention, biasing electrodes 14 and 16 are positioned symmetrically on opposing sides of MR stack 12 and charged with a biasing voltage V through a dedicated lead (not shown) such that the resulting electric field, E, from biasing voltage V creates a charge carrier-depleted region at the stack junctions (near dielectric layers 18 and 20) whose depth is determined by the magnitude of biasing voltage V. Biasing voltage V may be a positive DC bias voltage, a negative DC bias voltage, or an AC bias voltage. The depletion region causes sense current $I_S$ to be forced toward the center of MR stack 12, thereby narrowing the electrical read width of MR stack 12. The electrical read width is shown in FIG. 1a as $w_e$. The depth of the charge carrier-depleted region (and thus the electrical read width) is tunable by adjusting the magnitude of biasing voltage V. Examples of materials which are compatible with air-bearing surface (ABS) exposure and slider processing, and can thus be used for biasing electrodes 14 and 16, include Rh, Ti, CoPt, CoCrPt, Cr, NiPd, NiCu, Au, Pt, Pd, V, Ta, and any alloys thereof.

Figure 1B:
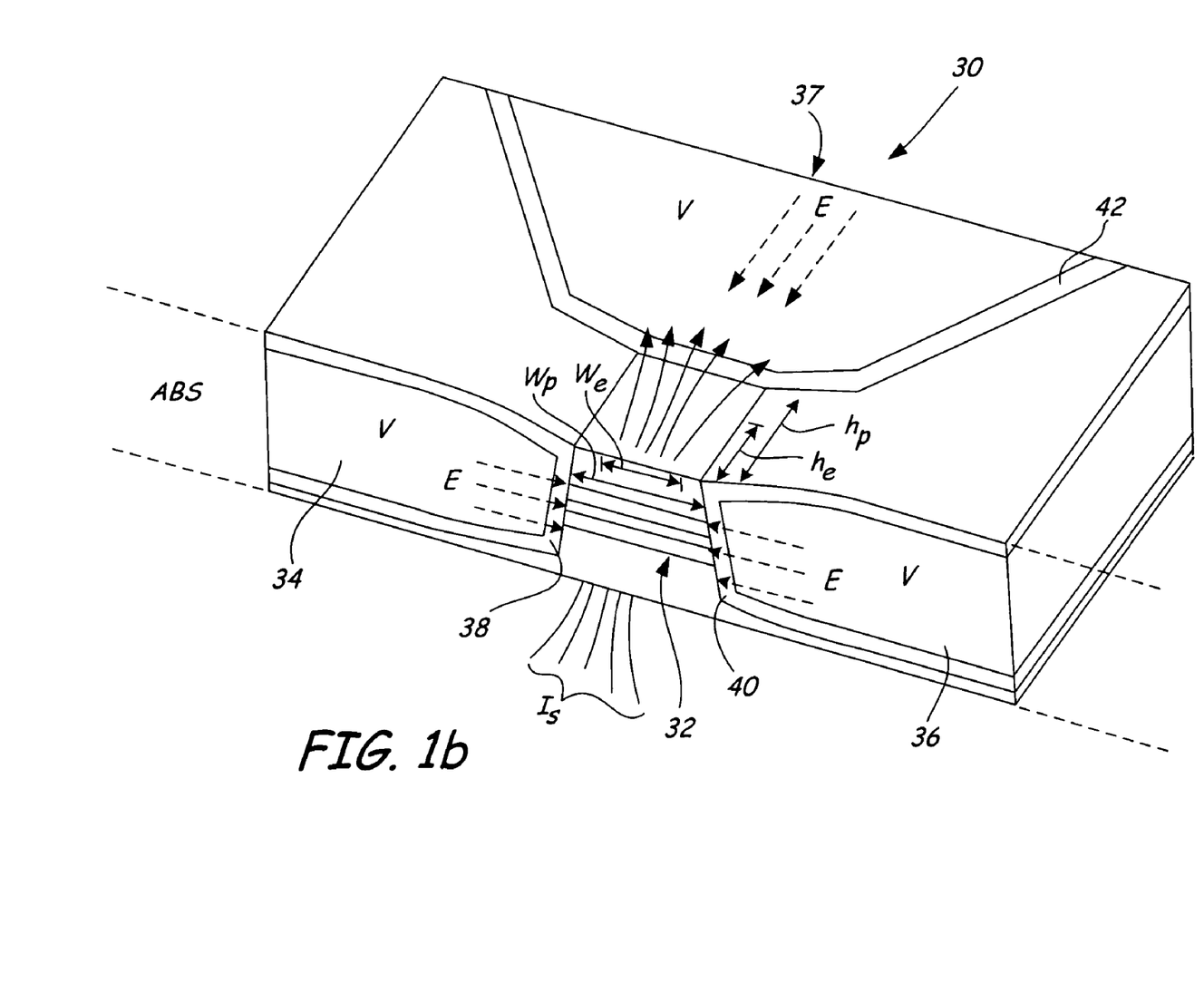
FIG. 1b is a perspective ABS view of a magnetoresistive device according to the present invention having an adjustable electrical read width and electrical stripe height.

FIG. 1b is a perspective ABS view of a MR device 30 according to the present invention having an adjustable electrical read width and electrical stripe height. MR device 30 includes MR stack 32 positioned between first biasing electrode 34 and second biasing electrode 36. MR device 30 further includes a third biasing electrode 37 positioned adjacent to MR stack 32 on a side opposite the ABS. MR stack 32 is preferably a CPP TMR stack including two ferromagnetic sensing layers with a nonmagnetic tunnel barrier positioned therebetween. MR stack 32 may alternatively be another CPP-type stack configuration, such as a tri-layer CPP stack, a CPP spin valve, or a CPP reader with in-stack stabilization and bias. For stack configurations requiring either an external stabilizing field parallel to the ABS or no external stabilizing field, biasing electrode 37 is a nonmagnetic conductive layer. For stack configurations requiring a stabilizing field traverse to the ABS, biasing electrode 37 is a permanent magnet layer which simultaneously stabilizes the magnetic layers in MR stack 32. Biasing electrode 34 is separated from MR stack 32 by thin dielectric layer 38, biasing electrode 36 is separated from MR stack 32 by thin dielectric layer 40, and biasing electrode 37 is separated from MR stack 32 by thin dielectric layer 42. Thin dielectric layers 38, 40, and 42 preferably have a thickness of about 50-150 Å.

In operation, a sense current $I_S$ flows perpendicular to the plane of the layers of MR stack 32. As indicated above, the change in resistivity of MR stack 32 can be detected by passing sense current $I_S$ through MR stack 32 and measuring a voltage across MR stack 32. External circuitry then converts the voltage information into an appropriate format and manipulates that information as necessary to recover the information encoded on the disc.

MR stack 32 has a physical read width, $w_p$, that is defined by the area between thin dielectric layers 38 and 40, and a physical stripe height, $h_p$, that is defined by the area between the ABS and thin dielectric layer 42. Physical dimensions $w_p$ and $h_p$ determine the resolution and sensitivity of MR device 30. As described above, the electrical read width and the electrical stripe height of MR device 30 may be altered by adjusting electrical dimensions of MR stack 32, thereby increasing the resolution and sensitivity of the device. According to the present invention, biasing electrodes 34 and 36 are positioned symmetrically on opposing sides of MR stack 32 and charged with a biasing voltage V through a dedicated lead (not shown). Similarly, biasing electrode 37 is positioned with respect to MR stack 32 on a side opposite the ABS and charged with a biasing voltage V such that the electric field, E, resulting from biasing voltage V creates a charge carrier-depleted region at the stack junctions (near dielectric layers 38, 40, and 42) whose depth is determined by the magnitude of biasing voltage V. Biasing voltage V may be a positive DC bias voltage, a negative DC bias voltage, or an AC bias voltage. The depletion region causes sense current $I_S$ to be forced toward the center MR stack 32, thereby narrowing the electrical read width of MR stack 32. The electrical read width is shown in FIG. 1b as $w_e$. Also, the depletion region causes sense current $I_S$ to be forced toward the ABS, thereby narrowing the electrical stripe height of MR stack 32. The electrical stripe height is shown in FIG. 1b as $h_e$. The depth of the charge carrier-depleted regions is tunable by adjusting the magnitude of biasing voltage V. Examples of materials which are compatible with ABS exposure and slider processing, and can thus be used for biasing electrodes 34 and 36, include Rh, Ti, CoPt, CoCrPt, Cr, NiPd, NiCu, Au, Pt, Pd, V, Ta, or any alloys thereof. Materials used for biasing electrode 37 must be compatible with wafer processing but do not require compatibility with ABS exposure and slider processing. Examples of such materials include Rh, Ti, CoPt, CoCrPt, Cr, NiPd, NiCu, Au, Pt, Pd, V, Ta, Cu, Ag, W, Sn, Zn, or any alloys thereof.

Successful operation of the reader designs of FIGS. 1a and 1b requires the width of the depletion regions of the MR stack to be a significant fraction of the physical read width. This means the penetration of the biasing electric field, E, into the MR stack must be on the order of several tens to hundreds of angstroms. For high-quality dielectric layers, breakdown fields are typically 10 MV/cm (that is, up to 10V can be applied across a 100 Å layer). Thus, applied fields in the 1-5 MV/cm range may be reasonably achieved across dielectric layers 18 and 20 in FIG. 1a and dielectric layers 38, 40, and 42 in FIG. 1b without damage to the MR stack.

For metal layers in the MR stack, the application of an external electric field will cause deflection of the mobile electrons such that an opposing electric field is set up at the surface that cancels the applied field. Since the charge carrier density in metals is very high ($10^{26}$ electrons/cm$^3$), this charge-depleted layer is only of the order of 1-10 Å in the 1-5 MV/cm field range. Thus, the effect on the electrical read width and electrical stripe height is not significant relative to the physical read width and stripe height. For semiconductors, however, which have charge carrier densities of $10^{22}$-$10^{23}$ electrons/cm$^3$, the penetration depths are much larger. Thus, the use of semiconducting layers in the reader stack is preferred for this technology to allow for a more significant adjustment of the electrical read width and electrical stripe height. Further, the use of semiconductive materials may be applied to insulating barriers or spacers if they can be made sufficiently thick within head resistance constraints so as to be fully dielectric. In this case, the electrostatic field from the electrodes can penetrate very far into the film and achieve similar effects at much lower voltages. Finally, in all embodiments described, the width of the charge-depleted region in a semiconducting layer can be controlled not only by the magnitude of the applied biasing voltage, but also by the thickness and composition of the semiconducting layer. This modifies the density of charge carriers deflected by the applied electric field.

Figures 2A, 2B, 2C:
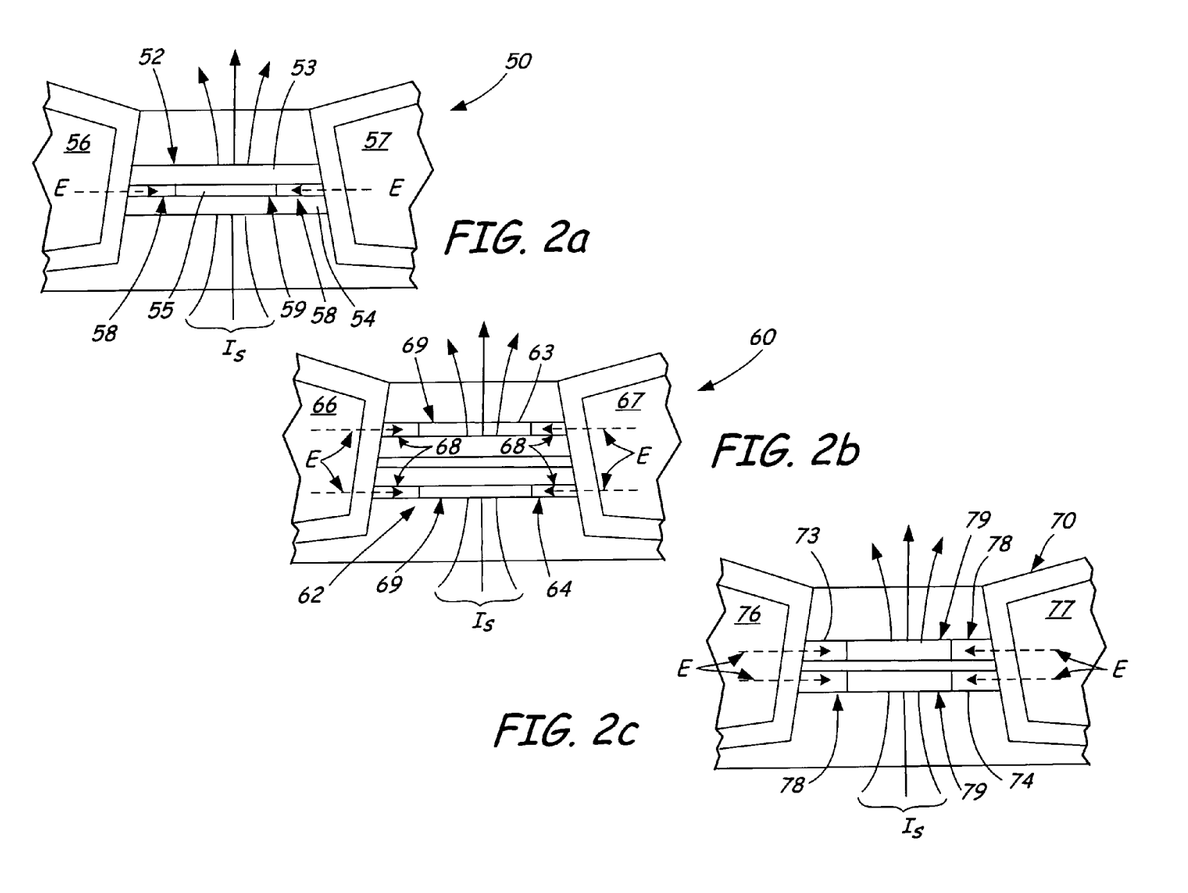
FIG. 2a is a schematic view of a first magnetoresistive stack configuration for active electrical read width control.
FIG. 2b is a schematic view of a second magnetoresistive stack configuration for active electrical read width control.
FIG. 2c is a schematic view of a third magnetoresistive stack configuration for active electrical read width control.

FIGS. 2a, 2b, and 2c are schematic views of MR stack configurations for active electrical read width control including semiconductive layers for greater penetration of the biasing electric field into the MR stack. The MR stacks shown in FIGS. 2a, 2b, and 2c are exemplary architectures for MR stack 12 of FIG. 1a and MR stack 32 of FIG. 1b. FIG. 2a shows MR device 50 including MR stack 52. MR stack 52 includes ferromagnetic layers 53 and 54 separated by nonmagnetic layer 55 made of a semiconductive material. Sense current $I_S$ flows perpendicular to the plane of the layers of MR stack 52. When biasing electrodes 56 and 57 are charged with an appropriate biasing voltage, electric field E creates charge carrier-depleted regions 58 at the stack junctions whose depth is determined by the magnitude of biasing voltage, the thickness of nonmagnetic layer 55, and the composition of nonmagnetic layer 55. Depletion regions 58 pinch off the current flow from the sides and restrict flow of sense current $I_S$ to center portion 59 of MR stack 52, thereby narrowing the electrical read width of MR stack 52. Example materials which may be used for semiconductive nonmagnetic layer 55 are discussed with regard to FIG. 3.

FIG. 2b shows MR device 60 including MR stack 62. MR stack 62 has a conventional active sensing portion. MR stack also includes semiconductive channeling layers 63 and 64 positioned on a top and a bottom of MR stack 62. Alternatively, a single semiconductive channeling layer may be positioned on the top or the bottom of MR stack 62. Sense current $I_S$ flows perpendicular to the plane of the layers of MR stack 62. When biasing electrodes 66 and 67 are charged with an appropriate biasing voltage, electric field E creates charge carrier-depleted regions 68 at the stack junctions whose depth is determined by the magnitude of biasing voltage, the thickness of semiconductive channeling layers 63 and 64, and the composition of semiconductive channeling layers 63 and 64. Semiconductive channeling layers 63 and 64 channel the flow of sense current $I_S$ to the center portions 69 of semiconductive channeling layers 63 and 64 between depletion regions 68, thereby narrowing the electrical read width of MR stack 62. Example materials which may be used for semiconductive channeling layers 63 and 64 are discussed with regard to FIG. 3.

FIG. 2c shows MR device 70 including MR stack 72. MR stack 72 includes ferromagnetic layers 73 and 74 separated by nonmagnetic layer 75. Ferromagnetic layers 73 and 74 are both made of a semiconductive material. In an alternative embodiment, only one of ferromagnetic layers 73 and 74 is made of a semiconductive material. Sense current $I_S$ flows perpendicular to the plane of the layers of MR stack 72. When biasing electrodes 76 and 77 are charged with an appropriate biasing voltage, electric field E creates charge carrier-depleted regions 78 at the stack junctions whose depth is determined by the magnitude of biasing voltage, the thickness of ferromagnetic layers 73 and 74, and the composition of ferromagnetic layers 73 and 74. Depletion regions 78 pinch off the current flow from the sides and restrict flow of sense current $I_S$ to center portion 79 of MR stack 72, thereby narrowing the electrical read width of MR stack 72. Example materials that may be used for semiconductive ferromagnetic layers 73 and 74 include CoTiO, $CrO_2$, ZnCoO, Heusler alloys, $Fe_3O_4$, Mn oxides with a perovskite structure (e.g., LrSrMnO), and Mn nitrides such as GaMnN.

Figure 3:
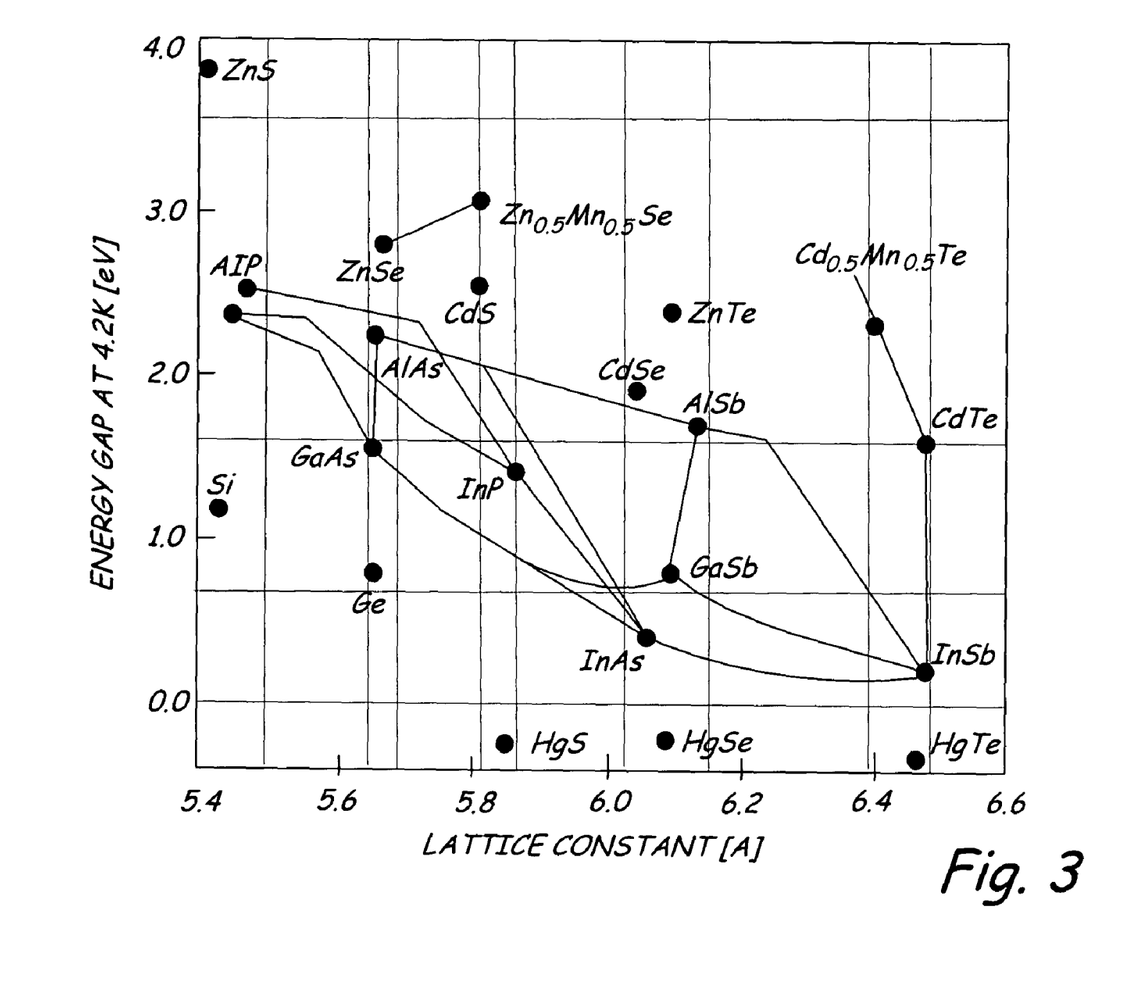
FIG. 3 is a graph of band gap versus lattice constant of semiconducting materials that may be used in the magnetoresistive stack configurations shown in FIGS. 2a and 2b.

FIG. 3 is a graph of band gap versus lattice constant of semiconductive materials that may be used in the MR stack configurations shown in FIGS. 2a and 2b. Semiconductive materials desirable for use in the MR stacks in FIGS. 2a and 2b have an energy gap at 4.2 K between about 1.5 and 3.5 eV and a lattice constant between about 5.4 and 6.6 Å. These materials include, but are not limited to, GaP, AlP, ZnSe, AlAs, CdS, CdSe, AlSb, ZnTe, and CdTe. Furthermore, if the nonmagnetic layer in the MR stack is a tunnel barrier, the nonmagnetic layer is preferably made of an oxide compound having a negative heat of formation for thermodynamic stability. Example oxide compounds that have a negative heat of formation include $Nd_2O_3$, MgO, $HfO_2$, $Y_2O_3$, $Al_2O_3$, $ZrO_2$, $Ti_2O_3$, $Ti_3O_5$, $W_2O_3$, $TiO_2$, $SiO_2$, $Ta_2O_5$, $V_2O_2$, $Nb_2O_4$, $Nb_2O_5$, MnO, $Cr_2O_3$, $Mn_3O_4$, $Mn_2O_3$, $V_2O_5$, $MgO_2$, $Fe_3O_4$, $Fe_2O_3$, $MoO_2$, $MnO_2$, $MoO_3$, NiO, CoO, $Co_3O_4$, $Cu_2O$, CuO, $RuO_2$, $Rh_2O_3$, $IrO_2$, $Ag_2O_2$, and alloys thereof. Alternatively, some nitride compounds and fluoride compounds with a negative heat of formation may be used as a tunnel barrier.

Figure 4:
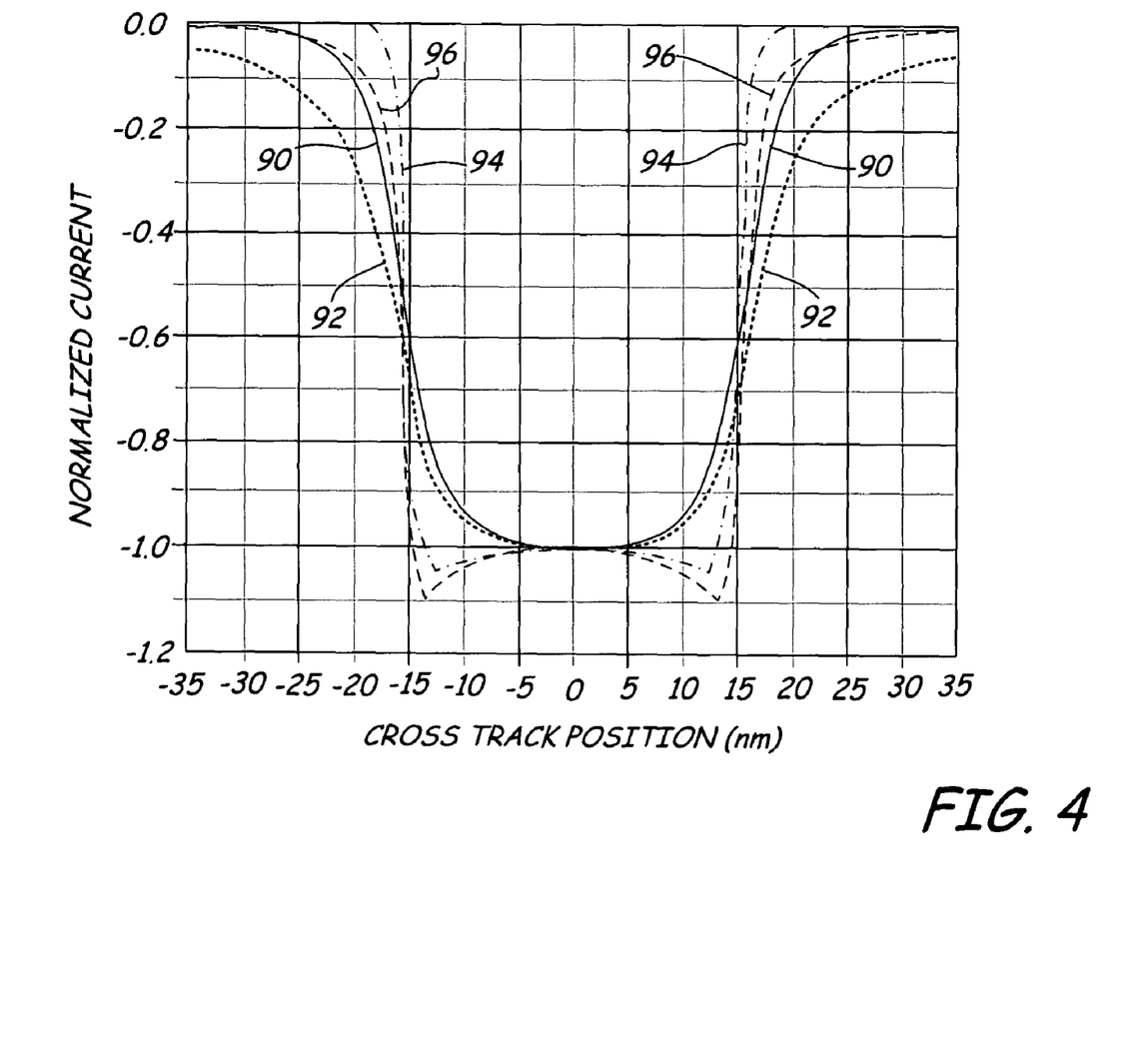
FIG. 4 is a graph showing a normalized perpendicular component of the sense current in the center of the magnetoresistive stack as a function of cross-track direction.

FIG. 4 is a graph showing a normalized perpendicular component of the sense current in the center of the MR stack as a function of cross-track direction for the configurations shown in FIGS. 2b and 2c. That is, FIG. 4 shows the normalized perpendicular component of the sense current in the nonmagnetic layer of the MR stack positioned between the two ferromagnetic layers (e.g., barrier layer in the case of a TMR device, nonmagnetic metal in the case of a GMR device, etc.) as a function of cross-track direction. The devices tested in FIG. 4 have a physical read width of 70 nm. Thus, the center of the MR stack is at a cross track position of 0 nm, where the normalized current has a value of −1.0 for all device configurations, and the dielectric layers that separate the biasing electrodes from the MR stack are positioned at a cross-track position of −35 nm and 35 nm.

In FIG. 4, trace 90 shows the cross-track current distribution for a device having two semiconductive channeling layers, one positioned on the top of the MR stack and one positioned on the bottom of the MR stack (embodiment shown in FIG. 2b). Trace 92 shows the cross-track current distribution for a device having a single semiconductive channeling layer positioned on the top or the bottom of the MR stack (alternative embodiment to FIG. 2b). Trace 94 shows the cross-track distribution for a device with both ferromagnetic layers in the MR stack made of a semiconductive material (embodiment shown in FIG. 2c). Trace 96 shows the cross-track current distribution for a device having one of the ferromagnetic layers in the MR stack made of a semiconductive material (alternative embodiment to FIG. 2c).

The extent of sense current confinement to the center of the MR stack may be characterized by determining the cross-track point at which the sense current amplitude drops to 10% of the sense current amplitude at the center of the MR stack (normalized current of −0.1). Stated differently, determining the cross-track point at which the normalized current is −0.1 effectively determines the electrical read width of the device. Thus, for the MR stack configuration of trace 90, the normalized current is −0.1 at ±21 nm from the center of the MR stack (electrical read width of 42 nm). In trace 92, the normalized current is −0.1 at ±26 nm from the center of the MR stack (electrical read width of 52 nm). In trace 94, the normalized current is −0.1 at ±17 nm from the center of the MR stack (electrical read width of 34 nm). In trace 96, the normalized current is −0.1 at ±19 nm from the center of the MR stack (electrical read width of 38 nm). As is shown, all configurations tested in FIG. 4 result in a significant confinement of the sense current toward the center of the MR stack. This results in a significant decrease in the electrical read width of the MR stack from the physical read width of 70 nm.

Figure 5A:
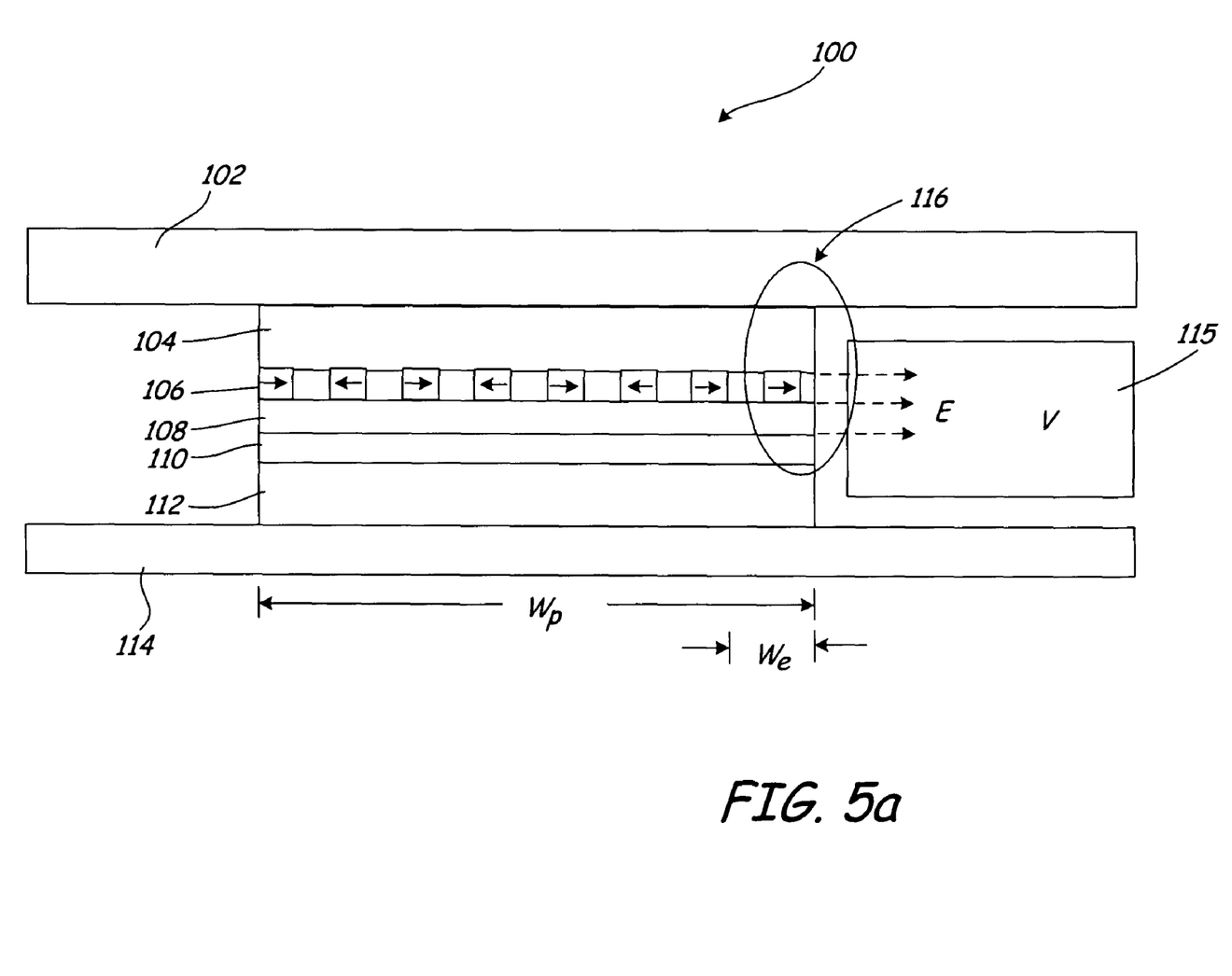
FIG. 5a is a cross-section view of another embodiment of a magnetoresistive device according to the present invention having an adjustable electrical read width.

FIG. 5a is a cross-section view of another embodiment of MR device 100 according to the present invention having an adjustable electrical read width. MR device 100 includes top shield/contact 102, synthetic antiferromagnetic (SAF) stabilization layer 104, ferromagnetic sensing layer 106, nonmagnetic layer 108, pinned layer 110, antiferromagnetic (AFM) pinning layer 112, and bottom shield/contact 114. MR device 100 also includes biasing electrode 115. MR device 100 is preferably a current-perpendicular-to-plane (CPP) tunneling magnetoresistive (TMR) stack, wherein nonmagnetic layer 108 is a nonmagnetic tunnel barrier. SAF stabilization layer 104 stabilizes a magnetization of ferromagnetic sensing layer 106, and AFM pinning layer 112 pins a magnetization of pinned layer 110 in a fixed direction. MR device 100 may alternatively be a CPP tri-layer stack, a CPP spin valve, or a CPP reader with in-stack stabilization and bias.

In operation, a sense current flows perpendicular to the plane of the layers of MR device 100. As indicated above, the change in resistivity of nonmagnetic layer 108 can be detected by passing the sense current through MR device 100 and measuring a voltage across MR device 100. External circuitry then converts the voltage information into an appropriate format and manipulates that information as necessary to recover the information encoded on the disc.

MR device 100 has a physical read width, $w_p$, which defines the physical track width of MR device 100. As described above, the read width of MR device 100 may be effectively altered by electrically adjusting dimensions of MR device 100, thereby increasing the resolution of the device without necessitating adjustment of physical dimensions. According to the present invention, biasing electrode 115 is positioned on a side of nonmagnetic layer 108 and charged with a biasing voltage V through a dedicated lead (not shown). At high potentials, the electric field, E, resulting from biasing voltage V pulls the sense current toward biasing electrode 115 such that the sense current only flows through region 116 of MR device 100. In a preferred embodiment, a granular material is used for sensing layer 106 to break sensing layer 106 into discrete, weakly coupled domains to prevent or eliminate side-reading of adjacent tracks on the magnetic media. A granular material may be formed by, for example, co-depositing a magnetic material with a material such as silver, gold, or an oxide compound, and subsequently annealing the layer to fully segregate the materials. The electrical read width is shown in FIG. 5a as $w_e$, and is defined by the greater of the lateral penetration of electric field E from biasing electrode 115 and the grain size of granular sensing layer 106. Electrical read width $w_e$ is tunable by adjusting the magnitude of biasing voltage V. Examples of materials which are compatible with air-bearing surface (ABS) exposure and slider processing, and can thus be used for biasing electrode 115, include Rh, Ti, CoPt, CoCrPt, Cr, NiPd, NiCu, Au, Pt, Pd, V, Ta, and any alloys thereof.

Figure 5B:
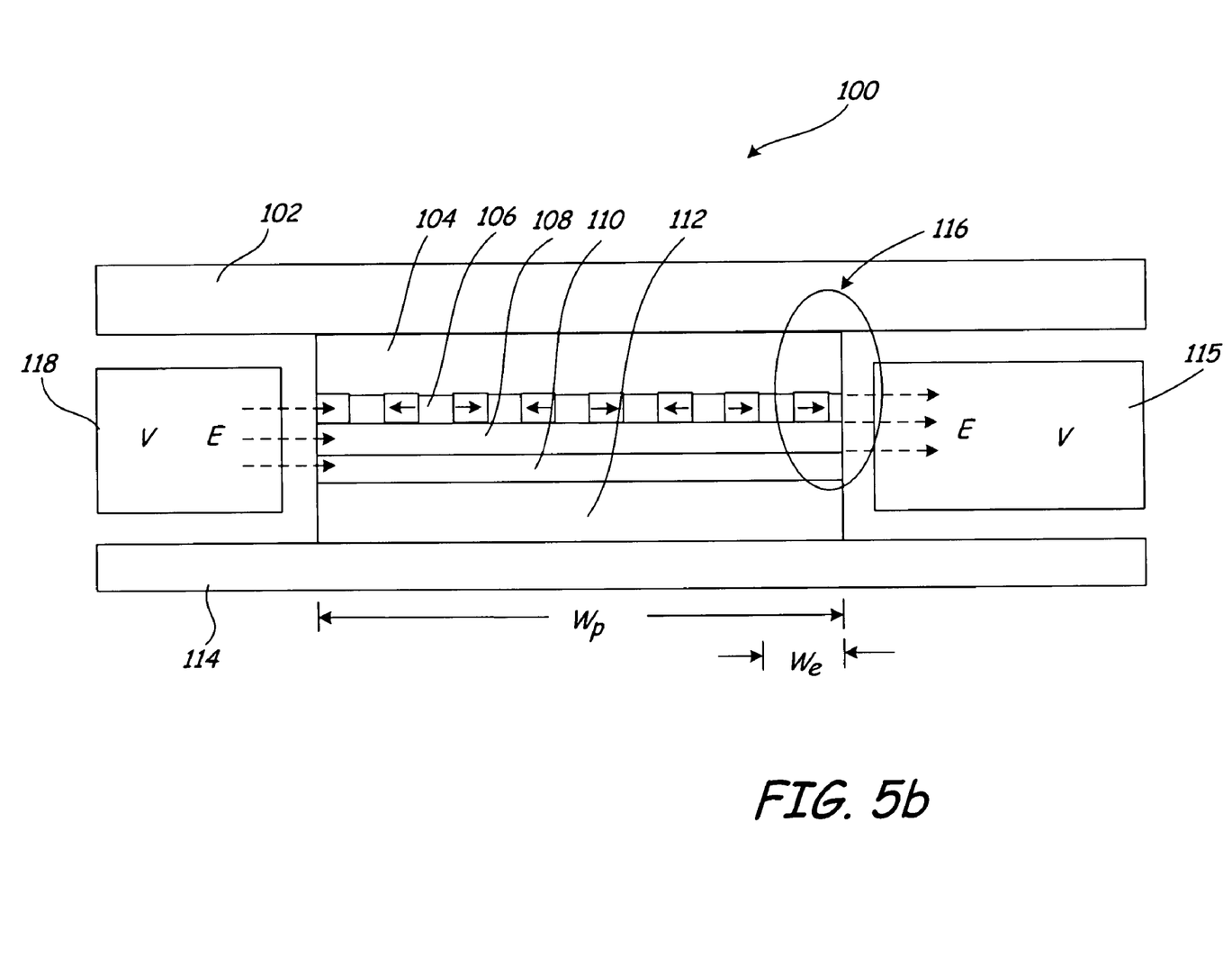

FIG. 5b is a cross-section view of alternative embodiment of MR device 100 according to the present invention. MR device includes a second biasing electrode 118 positioned on a side of nonmagnetic layer 108 opposite from biasing electrode 115. Biasing electrode 118 is also charged with a biasing voltage through a dedicated lead (not shown). The addition of biasing electrode 118 further crowds the sense current toward one side of MR device 100, thereby forcing a larger amount of the sense current through region 116.

The present invention is a magnetic sensor (preferably a magnetoresistive device) having adjustable electrical dimensions, such as electrical read width and electrical stripe height. The magnetoresistive device includes a magnetoresistive stack with bias electrodes positioned with respect to the magnetoresistive stack. The electrical width or electrical stripe height of the magnetoresistive stack is a function of the voltage driving the bias electrodes. In one embodiment, two bias electrodes are disposed on opposing sides of the magnetoresistive stack and driven with a negative bias voltage. The resulting electric field creates a charge carrier-depleted region at the stack junction whose depth is tunable by adjusting a magnitude of the electrode voltage. The depletion region causes the reader sense current to be constrained to the center of the magnetoresistive stack, thereby narrowing the electrical width. In another embodiment, two bias electrodes are disposed on opposing sides and biased with voltages of opposite polarity. Alternatively, a single bias electrode biases one side of the magnetoresistive stack. The resulting electric field crowds the reader sense current to a thin region at the stack junction whose depth is tunable by adjusting a magnitude of the electrode voltage. This causes the reader sense current to be constrained to a side of the magnetoresistive stack, thereby narrowing the electrical width. Optionally, a bias electrode may be positioned adjacent to the magnetoresistive stack on a side opposite from the air bearing surface. When a biasing field is applied to the bias electrode, the resulting electric field crowds the reader sense current toward the air bearing surface, thereby adjusting the electrical stripe height of the magnetoresistive stack.

Although the present invention has been described with reference to preferred embodiments, workers skilled in the art will recognize that changes may be made in form and detail without departing from the spirit and scope of the invention.

The invention claimed is:

1. A magnetic sensor comprising:
a sensor stack having a physical width with a corresponding electrical width and a physical height with a corresponding electrical height; and
means for generating an electric field in a direction generally transverse to a direction of sense current flow through the sensor stack to create a charge carrier depleted region in the sensor stack such that at least one of (a) the electrical width is smaller than the physical width and (b) the electrical height is smaller than the physical height.

2. The magnetic sensor of claim 1, wherein the means for providing an electric field comprises two bias electrodes disposed on opposing sides of the sensor stack such that the electrical width of the sensor stack is a function of a bias voltage applied to the two bias electrodes.

3. The magnetic sensor of claim 2, wherein the two bias electrodes are biased with negative DC bias voltages.

4. The magnetic sensor of claim 2, wherein the two bias electrodes are biased with positive DC bias voltages.

5. The magnetic sensor of claim 2, wherein the two bias electrodes are biased with an AC bias voltage.

6. The magnetic sensor of claim 2, wherein the two bias electrodes are biased with bias voltages of opposite polarity.

7. The magnetic sensor of claim 1, wherein the means for providing an electric field comprises a bias electrode disposed on a side of the sensor stack such that the electrical width of the sensor stack is a function of a voltage of the bias electrode.

8. The magnetic sensor of claim 1, wherein the means for providing an electric field comprises a bias electrode positioned such that the electrical height of the sensor stack is a function of a bias voltage applied to the bias electrode.

9. A magnetoresistive read head comprising:
a magnetoresistive stack; and
a first bias electrode separated from the magnetoresistive stack by a first dielectric layer and positioned with respect to the magnetoresistive stack to generate an electric field in a direction generally transverse to a direction of sense current flow through the magnetoresistive stack such that a read width of the magnetoresistive stack is a function of a bias voltage applied to the first bias electrode.

10. The magnetoresistive read head of claim 9, wherein the first bias electrode and the first dielectric layer are disposed on a first side of the magnetoresistive stack.

11. The magnetoresistive read head of claim 10, further comprising:
a second bias electrode separated from the magnetoresistive stack by a second dielectric layer and disposed on a second side of the magnetoresistive stack opposite the first side, the first and second bias electrodes each providing a voltage.

12. The magnetoresistive read head of claim 11, further comprising
a third bias electrode separated from the magnetoresistive stack by a third dielectric layer and positioned such that an electrical stripe height of the magnetoresistive stack is a function of a bias voltage applied to the third bias electrode.

13. The magnetoresistive read head of claim 10, further comprising:
a second bias electrode separated from the magnetoresistive stack by a second dielectric layer and disposed on a side of the magnetoresistive stack opposite the first bias electrode, the second bias electrode having a bias voltage of opposite polarity to a bias voltage applied to the first bias electrode.

14. The magnetoresistive read head of claim 9, wherein the first bias electrode is made of a material selected from the group consisting of Rh, Ti, CoPt, CoCrPt, Cr, NiPd, NiCu, Au, Pt, Pd, V, Ta, and alloys thereof.

15. The magnetoresistive read head of claim 9, wherein the magnetoresistive stack is a tunneling magnetoresistive stack including two sensing layers with a tunnel barrier positioned therebetween.

16. The magnetoresistive read head of claim 15, wherein the tunnel barrier is made of a semiconductive material selected from the group consisting of GaP, AlP, ZnSe, AlAs, CdS, CdSe, AlSb, ZnTe, CdTe, and alloys thereof.

17. The magnetoresistive read head of claim 15, wherein the tunnel barrier is a dielectric barrier made of an oxide compound having a negative heat of formation.

18. The magnetoresistive read head of claim 15, further comprising:
one or more semiconductive current channeling layers positioned within the magnetoresistive stack.

19. The magnetoresistive read head of claim 18, wherein the one or more semiconductive current channeling layers are made of a semiconductive material selected from the group consisting of GaP, AlP, ZnSe, AlAs, CdS, CdSe, AlSb, ZnTe, CdTe, and alloys thereof.

20. The magnetoresistive read head of claim 15, wherein the sensing layers are made of a magnetic semiconductive material.

21. The magnetoresistive read head of claim 15, wherein the sensing layers are made of a half-metallic ferromagnetic material selected from the group consisting of $CrO_2$, CoTiO, ZnCoO, a Heusler alloy, $Fe_3O_4$, a Mn oxide compound with a perovskite structure, and a Mn nitride compound.

22. The magnetoresistive read head of claim 9, wherein the magnetoresistive stack is a giant magnetoresistive stack including two sensing layers with a conducting spacer positioned therebetween.

23. A magnetic sensor comprising:
a sensor stack; and
at least one electrode separated from the sensor stack by a dielectric layer and configured to generate an electric field generally perpendicular to a direction of sense current flow through the sensor stack to produce a charge carrier-depleted region in the magnetic sensor that confines the sense current to a smaller area in the magnetic sensor.

24. The magnetic sensor of claim 23, wherein the at least one electrode comprises first and second bias electrodes disposed on opposing sides of the sensor stack and separated from the sensor stack by first and second dielectric layers, respectively, such that an electrical width of the sensor stack is a function of a bias voltage applied to the two bias electrodes.

25. The magnetic sensor of claim 23, wherein the at least one electrode comprises a bias electrode positioned such that an electrical height of the sensor stack is a function of a bias voltage applied to the bias electrode.

* * * * *